United States Patent
Gouthaman et al.

(10) Patent No.: US 9,336,116 B2
(45) Date of Patent: *May 10, 2016

(54) AUTOMATIC CORRELATION ACCELERATOR

(71) Applicant: Accenture Global Services Limited, Dublin (IE)

(72) Inventors: Jothi Gouthaman, Chennai (IN); Nantha Kumar, Chennai (IN); Vinod Kumar Palla, Hyderabad (IN); Jeyaraj Harimurali, Chennai (IN); Radhika Golden, Chennai (IN)

(73) Assignee: Accenture Global Services Limited, Dublin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,814

(22) Filed: Jul. 24, 2014

(65) Prior Publication Data

US 2014/0336986 A1 Nov. 13, 2014

Related U.S. Application Data

(63) Continuation of application No. 13/275,447, filed on Oct. 18, 2011, now Pat. No. 8,825,447.

(30) Foreign Application Priority Data

Jan. 28, 2011 (IN) ............................... 258CHE2011

(51) Int. Cl.
*G06F 11/34* (2006.01)
*G06F 11/36* (2006.01)

(52) U.S. Cl.
CPC ........ *G06F 11/3414* (2013.01); *G06F 11/3672* (2013.01)

(58) Field of Classification Search
USPC .......................................................... 702/186
See application file for complete search history.

(56) References Cited

U.S. PATENT DOCUMENTS

| | | | |
|---|---|---|---|
| 2010/0269095 A1* | 10/2010 | King | G06F 8/41 717/111 |
| 2011/0016457 A1 | 1/2011 | Artzi et al. | |
| 2012/0066378 A1 | 3/2012 | Lui et al. | |

OTHER PUBLICATIONS

U.S. Non-Final Office Action for U.S. Appl. No. 13/275,447 dated Apr. 4, 2014, 6 pages.
U.S. Notice of Allowance for U.S. Appl. No. 13/275,447 dated Jun. 12, 2014, 8 pages.

* cited by examiner

*Primary Examiner* — Bryan Bui
(74) *Attorney, Agent, or Firm* — Fish & Ricahrdson P.C (57) ABSTRACT

Automatic correlation, in which an automatic correlation accelerator tool accesses at least a first and a second recording of a base script that defines operations executed in testing performance of a system. The tool causes the system to execute the first recording of the base script and the second recording of the base script and stores, in electronic storage, dynamic value data that describes dynamic values generated during execution of the first recording of the base script and during execution of the second recording of the base script. The tool automatically, without human intervention, analyzes the stored dynamic value data to identify candidates for correlation within the base script and generates a correlated script based on the identified candidates for correlation and the base script.

37 Claims, 9 Drawing Sheets

AUTOMATIC CORRELATION ACCELERATOR

CROSS-REFERENCE TO RELATED APPLICATION

This application is a continuation (and claims the benefit of priority under 35 USC 120) of U.S. patent application Ser. No. 13/275,447, filed Oct. 18, 2011, which claims the benefit of Indian Patent Application No. 258/CHE/2011, filed on Jan. 28, 2011. Both of these applications are incorporated herein by reference in their entirety for all purposes.

FIELD

This disclosure relates to automatic correlation technology.

BACKGROUND

Automated processes may be used to performance test a system. The automated processes may simulate actions performed on the system by many users to test whether the system can handle anticipated load and determine statistics on the quality of use provided by the system under various test conditions. The automated processes may reference various scripts of user actions to test a variety of circumstances the system may encounter during operation.

SUMMARY

In one aspect, an automatic correlation accelerator tool includes at least one processor and at least one memory coupled to the at least one processor having stored thereon instructions which, when executed by the at least one processor, causes the at least one processor to perform operations. The operations include accessing, from electronic storage, at least a first recording of a base script and a second recording of the base script. The base script defines operations executed in testing performance of a system. The operations also include causing the system to execute the accessed first recording of the base script and the accessed second recording of the base script and storing, in electronic storage, dynamic value data that describes dynamic values generated during execution of the accessed first recording of the base script and during execution of the accessed second recording of the base script. The operations further include automatically, without human intervention, analyzing the stored dynamic value data to identify candidates for correlation within the base script, generating a correlated script based on the identified candidates for correlation and the base script, and storing, in electronic storage, the correlated script.

Implementations may include one or more of the following features. For example, the operations may include automatically, without human intervention, performing parameterization of the correlated script. The operations also may include generating a correlated and parameterized script based on the parameterization of the correlated script. The operations further may include automatically, without human intervention, causing the system to execute the correlated and parameterized script. The execution of the correlated and parameterized script may result in testing performance of the system. In addition, the operations may include generating performance testing output for the system based on the execution of the correlated and parameterized script.

In some implementations, the operations may include generating and storing a dynamic value list that includes dynamic values generated during execution of the accessed first recording of the base script and during execution of the accessed second recording of the base script. In these implementations, the operations may include automatically, without human intervention, generating a correlation log using the dynamic value list and the accessed first recording of the base script. Further, in these implementations, the operations may include generating a correlated script using the correlation log and the accessed first recording of the base script.

In some examples, the operations may include automatically, without human intervention, generating a parameterization log using the dynamic value list and the accessed first recording of the base script. In these examples, the operations may include automatically, without human intervention, performing parameterization analysis using the parameterization log, the correlated script, and the accessed first recording of the base script. In addition, in these examples, the operations may include generating a correlated and parameterized script based on the parameterization analysis and generating a correlated and parameterized script that is ready for execution by a performance testing controller.

In some implementations, the operations may include comparing the accessed first recording of the base script with the accessed second recording of the base script to validate the first and second recordings of the base script. In these implementations, the operations may include generating and storing a validation log that describes results of the validation of the first and second recordings of the base script and filtering lines of the first and second recordings of the base script using the validation log, the accessed first recording of the base script, and the accessed second recording of the base script.

In some examples, the operations may include generating, based on filtering lines of the first and second recordings of the base script, a first temporary recording of the base script and a second temporary recording of the base script. In these examples, the operations may include generating correlation logs using the first temporary recording of the base script and the second temporary recording of the base script. In addition, in these examples, the operations may include generating a final recording of the base script that is usable for performance testing by performing script generation and output formatting using the correlation logs and the first temporary recording of the base script.

In another aspect, a method includes accessing, by an automatic correlation accelerator tool and from electronic storage, at least a first recording of a base script and a second recording of the base script. The base script defines operations executed in testing performance of a system. The method also includes causing, by the automatic correlation accelerator tool, the system to execute the accessed first recording of the base script and the accessed second recording of the base script and storing, in electronic storage, dynamic value data that describes dynamic values generated during execution of the accessed first recording of the base script and during execution of the accessed second recording of the base script. The method further includes automatically, by the automatic correlation accelerator tool and without human intervention, analyzing the stored dynamic value data to identify candidates for correlation within the base script, generating, by the automatic correlation accelerator tool, a correlated script based on the identified candidates for correlation and the base script, and storing, in electronic storage, the correlated script.

In yet another aspect, at least one computer-readable storage medium is encoded with executable instructions that, when executed by at least one processor, cause the at least one processor to perform operations. The operations include accessing, from electronic storage, at least a first recording of a base script and a second recording of the base script. The base script defines operations executed in testing performance of a system. The operations also include causing the system to execute the accessed first recording of the base script and the accessed second recording of the base script and storing, in electronic storage, dynamic value data that describes dynamic values generated during execution of the accessed first recording of the base script and during execution of the accessed second recording of the base script. The operations further include automatically, without human intervention, analyzing the stored dynamic value data to identify candidates for correlation within the base script, generating a correlated script based on the identified candidates for correlation and the base script, and storing, in electronic storage, the correlated script.

The details of one or more implementations are set forth in the accompanying drawings and the description, below. Other potential features and advantages of the disclosure will be apparent from the description and drawings, and from the claims.

DETAILED DESCRIPTION

In some implementations, an automatic correlation accelerator tool reduces the correlation scripting effort for performance, stress, and load testing scripts. In these implementations, the automatic correlation accelerator tool parses through response files of a recorded script, compares it with an identical recording of another script for the same business flow to identify the correlation parameters, and creates a new script with the identified correlation parameters. The new script with the identified correlation parameters may be used for performance, stress, and load testing.

Figure 1:
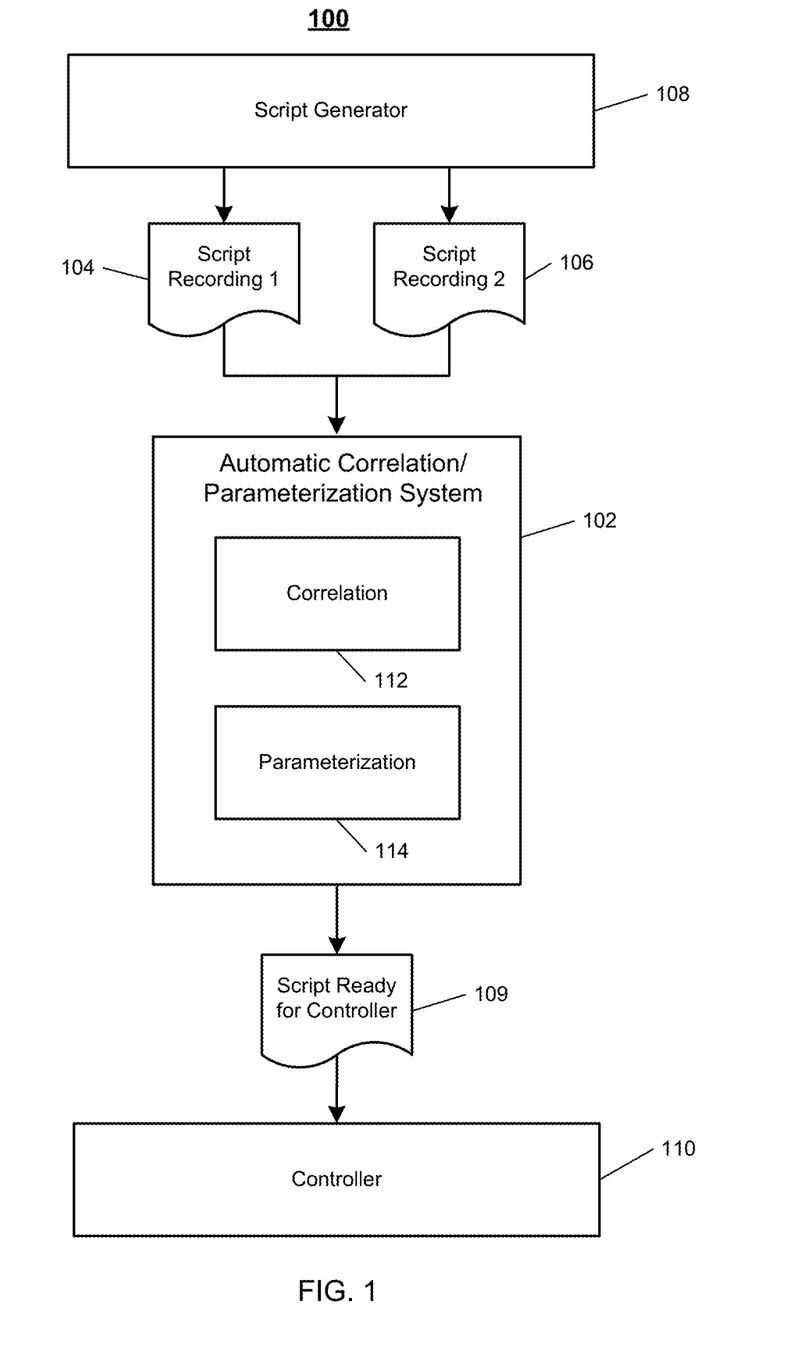
FIGS. 1, 2, and 9 are diagrams of exemplary systems.

FIG. 1 illustrates an exemplary system 100 for generating a correlated script. An automatic correlation and parameterization system 102 takes as input a first script recording 104 and a second script recording 106. The first and second script recordings 104 and 106 may have been generated, for example, using a script generator 108 or may have been coded manually by a developer. The first and second script recordings 104 and 106 may be accessed from electronic storage and each may be a recording of a base script which is used to test performance of a system. The first and second script recordings 104 and 106 describe acts that a virtual user may perform during a test scenario. For example, the first and second script recordings 104 and 106 may include instructions which simulate a virtual user performing actions which result in various interactions with one or more servers.

With some server interactions, a server may return to a client one or more dynamic values which are unique for each interaction with the server. For example, a dynamic value may be a unique identifier, and/or may be a value which is based on the current date and time. The server sends the dynamic value to the client so that the server can identify a subsequent response sent by the client. For a testing scenario using the base script and virtual users, a correlation and/or parameterization process may need to be performed so that the base script is able to identify a dynamic value sent from a server and to use that dynamic value in subsequent responses sent to the server. If a correlation and/or parameterization process is not performed, executing the base script may result in an error due to a server not recognizing a value sent from a client.

Manually identifying dynamic values can be a lengthy and error-prone process which can require specific knowledge of both a testing tool and of a specific server system. To reduce an amount of manual effort needed to perform correlation and parameterization, the automatic correlation and parameterization system 102 may be used. The automatic correlation and parameterization system 102 is configured to automatically identify dynamic values and to generate a correlated and parameterized script 109 which can be executed by a performance testing controller 110 to test performance of the system to be tested.

In further detail, the automatic correlation and parameterization system 102 includes a correlation component 112 which initiates execution of the first script recording 104 and the second script recording 106 and stores, in electronic storage, dynamic value data that describes dynamic values generated during execution of the first script recording 104 and the second script recording 106. The correlation component 112 automatically, without human intervention, analyzes the stored dynamic value data to identify candidates for correlation within the base script. For example, the correlation component 112 may compare dynamic value data generated during execution of the first script recording 104 to dynamic value data generated during execution of the second script recording 106.

The correlation component 112 generates the correlated script 109 based on the identified candidates for correlation and the base script and may store the correlated script 109 in electronic storage. In some implementations, the automatic correlation system 102 automatically, without human intervention, initiates the execution of the correlated script 109 by the performance testing controller 110 to test performance of the system to be tested.

The automatic correlation and parameterization system 102 also includes a parameterization component 114. The parameterization component 114 may be used to create a script that is parameterized as well as correlated. A script parameter is a value that may change for every script execution. Rather than a value corresponding to a server-generated dynamic value, however, a parameter value may be supplied by a user, or may be read from electronic storage accessible from the performance testing controller 110. The parameterization component 114 may analyze the stored dynamic value data, may automatically identify parameters based on the analyzed dynamic value data, and may generate a correlated and parameterized script which includes the identified parameters.

Although the example shown in FIG. 1 shows the automatic correlation and parameterization system 102 as performing parameterization after correlation, other examples may be used. For instance, the automatic correlation and parameterization system 102 may perform parameterization prior to correlation in generating the correlated script 109.

In addition, although the example shown in FIG. 1 shows the automatic correlation and parameterization system 102 as performing both correlation and parameterization, other examples may be used. Specifically, correlation and parameterization are independent processes that may be performed by the same system or may be performed by different systems (e.g., an automatic correlation system that performs correlation and an automatic parameterization system that performs parameterization).

Also, as indicated above, correlation and parameterization may be performed in different orders and at different times based on configuration of the system. Accordingly, in some implementations, an automatic correlation system may perform correlation prior to an automatic parameterization system performing parameterization in generating the correlated script 109. In other implementations, an automatic parameterization system may perform parameterization prior to an automatic correlation system performing correlation in generating the correlated script 109. In further implementations, only correlation may be performed or only parameterization may be performed to facilitate generation of a script that is ready for performance testing.

Figure 2:
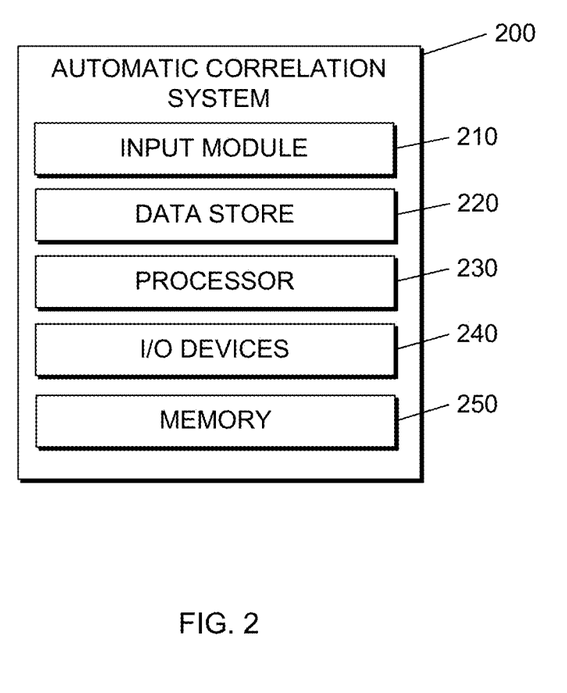

FIG. 2 illustrates an exemplary automatic correlation system 200 for generating a correlated script. The system 200 includes an input module 210, a data store 220, one or more processors 230, one or more I/O (Input/Output) devices 240, and memory 250. The input module 220 may be used to input any type of information related to generating a correlated script on the system 200. For example, the input module 210 may be used to receive a selection of a first recording of a base script and a second recording of the base script, where the base script defines operations executed in testing performance of a system. In some implementations, data from the input module 210 is stored in the data store 220. The data included in the data store 220 may include, for example, base scripts, correlation logs, parameterization logs, dynamic value data, generated correlation scripts, and multiple recordings of the base script, including temporary recordings.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
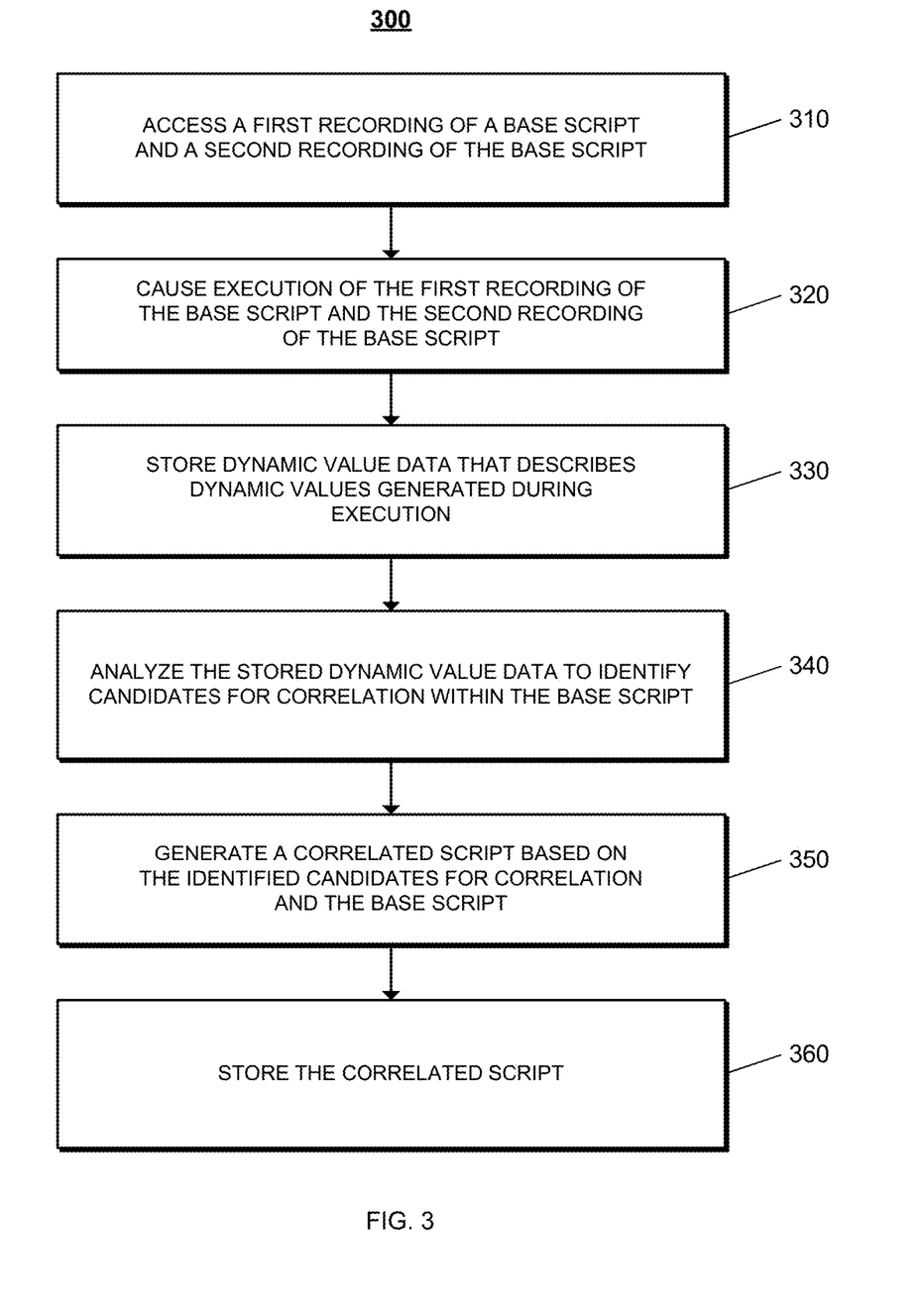
FIGS. 3, 5, and 8 are flowcharts of exemplary processes.

FIG. 3 illustrates a process 300 for generating a correlated script. The operations of the process 300 are described generally as being performed by the system 200. In some implementations, operations of the process 300 may be performed by one or more processors included in one or more electronic devices.

The system 200 accesses a first recording of a base script and a second recording of the base script (310). For example, the base script may define operations executed in testing performance of a system. The base script may, for example, define actions of a virtual user which result in one or more interactions with one or more server systems.

The system 200 causes execution of the first recording of the base script and the second recording of the base script (320). For example, the first recording of the base script and the second recording of the base script may be executed by a performance testing controller.

The system 200 stores dynamic value data that describes dynamic values generated during execution (330). For example, the system 200 may store dynamic value data generated during execution of the first recording of the base script and during execution of the second recording of the base script. Dynamic value data may include, for example, dynamic values generated by a server. Dynamic value data may be stored, for example, in one or more dynamic value lists.

The system 200 analyzes the stored dynamic value data to identify candidates for correlation within the base script (340). For example, the system 200 may compare dynamic value data generated during execution of the first recording of the base script to dynamic value data generated during execution of the second recording of the base script. The system 200 may automatically, without human intervention, generate a correlation log using the dynamic value list and the accessed first recording of the base script. The correlation log may include, for example, a list of candidates for correlation, and for each candidate, left boundary and right boundary delimiters which surround the correlation candidate in response data received from a server. The correlation log may include other data associated with each candidate for correlation.

The system 200 generates a correlated script based on the identified candidates for correlation and the base script (350). For example, the system 200 may generate a correlated script by inserting, for each correlation candidate, instructions into the base script at a location corresponding to the correlation candidate, to save a dynamic value received from the server.

The system 200 stores the correlated script (360). For example, the correlated script may be stored in a data store (e.g., the data store 220 described above with respect to FIG. 2). The modified base script may be saved in electronic storage as the correlated script. A copy of the original base script may be generated and may be stored in electronic storage.

Figure 4:
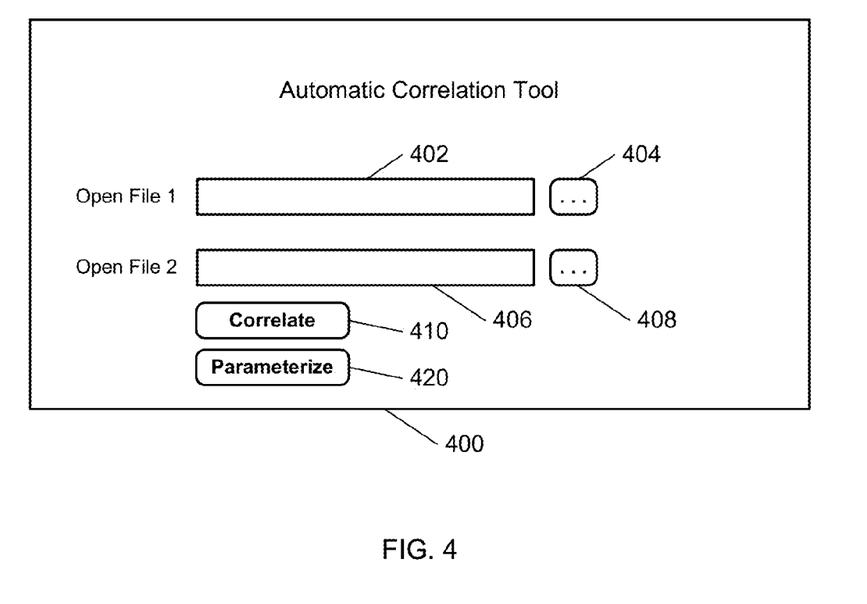
FIG. 4 is a diagram illustrating an exemplary user interface.

FIG. 4 illustrates an exemplary user interface 400 for generating a correlated script. A user may enter file identification information for a first script recording using a text control 402 or may browse for the first script recording using a browse control 404. Similarly, the user may enter file identification information for a second script recording using a text control 406 or may browse for the second script recording using a browse control 408. The user may initiate generation of a correlated script based on the first script recording and the second script recording by selecting a control 410. In some implementations, the user interface 400 includes a control 420 to configure whether parameterization is performed as well as correlation to generate a correlated and parameterized script.

Figure 5:
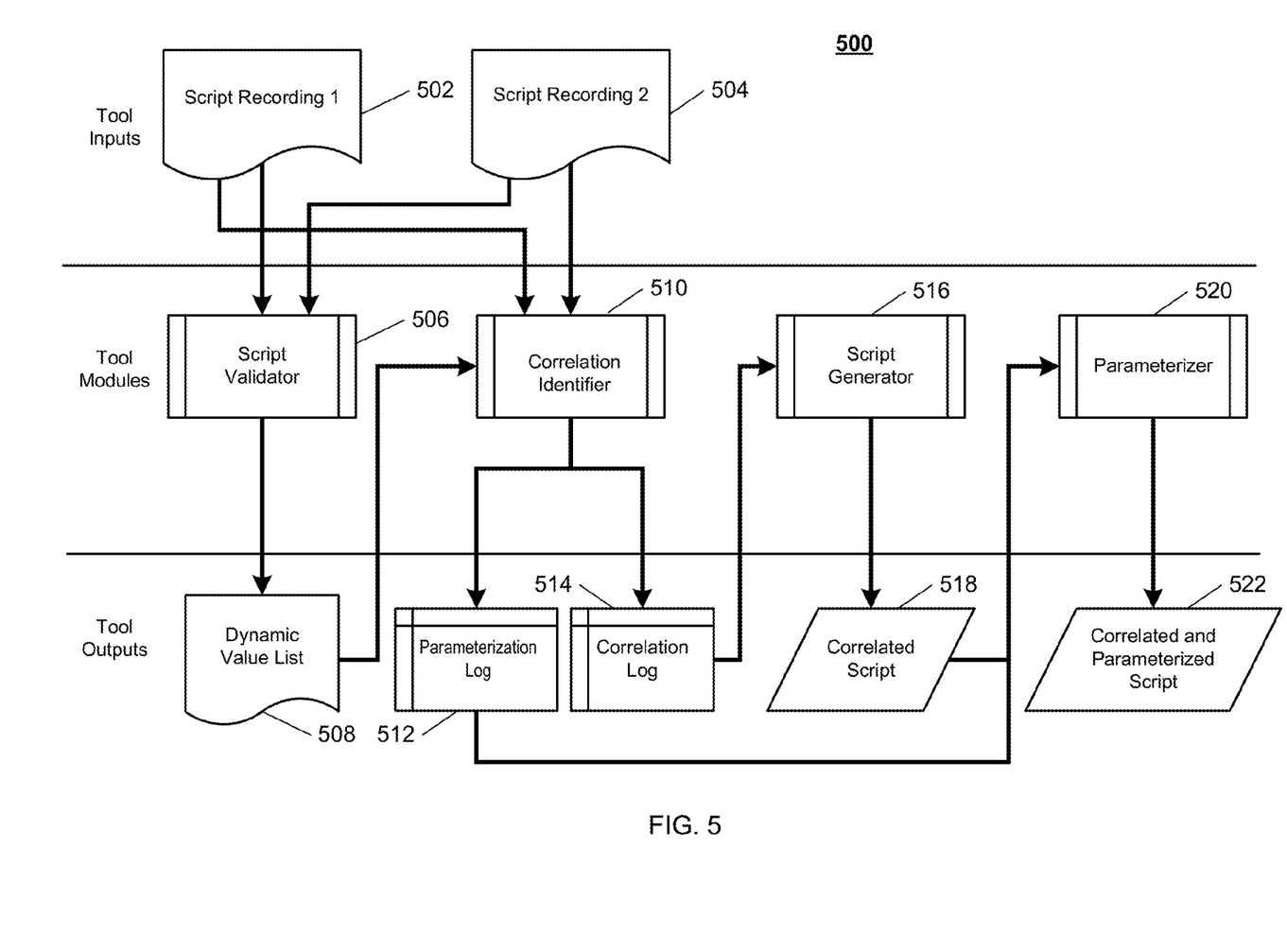

FIG. 5 illustrates a flowchart of an exemplary process 500 for generating a correlated and parameterized script. In some implementations, operations of the process 500 may be performed by one or more processors included in one or more electronic devices. A first script recording 502 and a second script recording 504 are accessed, such as from electronic storage, and are used by a script validator sub process 506 to generate a dynamic value list 508.

For example, the script validator sub process 506 may include the execution of the first and second script recordings 502 and 504 and the comparing of server responses received from execution of the first script recording 502 to server responses received from execution of the second script recording 504. The script validator sub process 506 may include storing identified differences between server responses for the first script recording 502 and server responses for the second script recording 504 in the dynamic value list 508.

Figure 6:
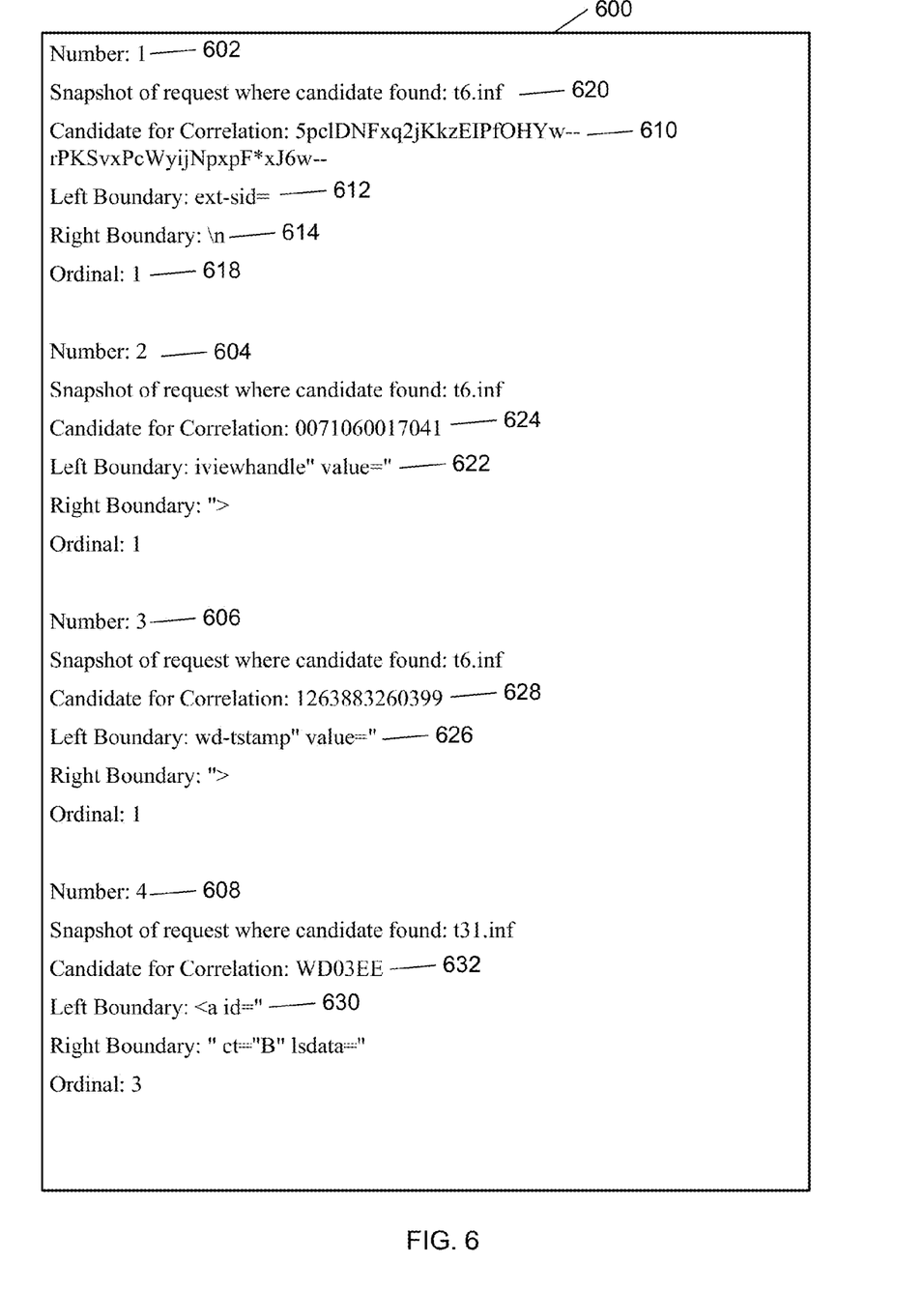
FIG. 6 is a diagram illustrating an exemplary correlation log.
Figure 7:
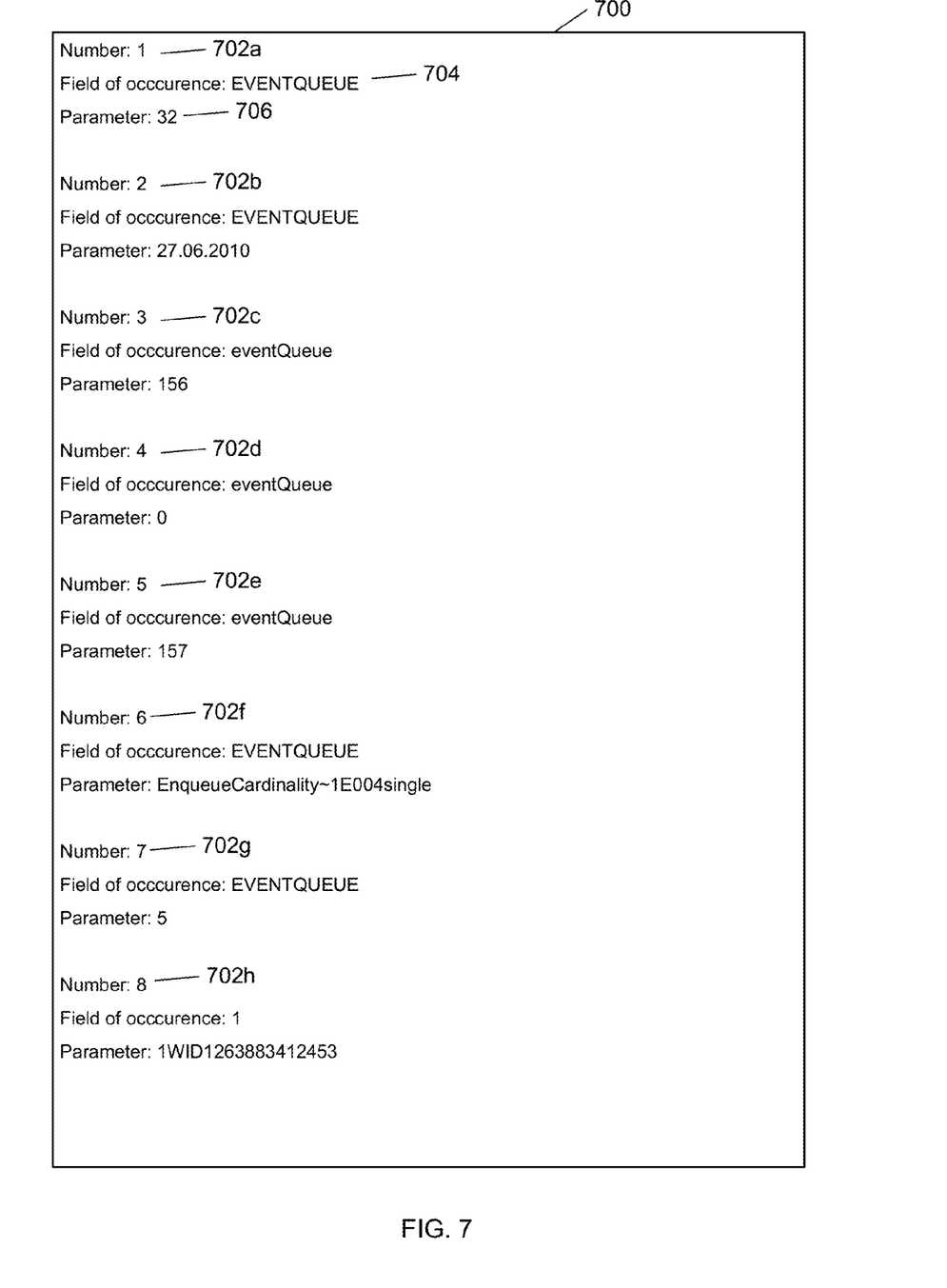
FIG. 7 is a diagram illustrating an exemplary parameterization log.
Like reference numbers represent corresponding parts throughout.

A correlation identifier sub process 510 may use the dynamic value list 508 to generate a parameterization log 512 and a correlation log 514. For example, FIG. 6 illustrates an example correlation log 600 and FIG. 7 illustrates an example parameterization log 700. The example correlation log 600 includes information for correlation candidates 602, 604, 606, and 608. The correlation log 600 includes, for the correlation candidate 602, an associated, identified dynamic data value 610, a left boundary delimiter 612 and a right boundary delimiter 614. The left boundary delimiter 612 and the right boundary delimiter 614 surround the dynamic data value 610 in response data received from a server. The correlation log 600 may include other information for the correlation candidate 602, such as an ordinal number 618 and an indication 620 of a request snapshot associated with the correlation candidate. The ordinal number 618 may be used for data that is part of an array.

A left boundary delimiter may indicate the type of an associated dynamic data value. For example, the left boundary delimiter 612 indicates that the dynamic data value 610 is an "ext-sid" identifier. A left boundary delimiter 622 may indicate that a dynamic data value 624 associated with the correlation candidate 604 is an "iviewhandle" value. A left boundary delimiter 626 may indicate that a dynamic data value 628 associated with the correlation candidate 606 is a timestamp value. A left boundary delimiter 630 may indicate that a dynamic data value 632 associated with the correlation candidate 608 is an identifier.

The example parameterization log 700 illustrated in FIG. 7 includes parameter entries 702a-702h. The example parameterization log includes, for each parameter entry 702, a field of occurrence and a parameter value. For example, the parameter entry 702a includes a field of occurrence 704 indicating an EVENTQUEUE field, and a parameter value 706 of thirty two.

Returning to FIG. 5, a script generator sub process 516 may use the correlation log 514 to generate a correlated script 518 and a parameterization sub process 520 may use the parameterization log 512 and the correlated script 518 to generate a correlated and parameterized script 522. In some implementations and for some script generations, the correlated and parameterized script 522 is automatically executed, without human intervention, resulting in performance testing of a system to be tested. Based on execution of the correlated and parameterized script 522, performance testing output may be generated and may be stored in electronic storage.

Figure 8:
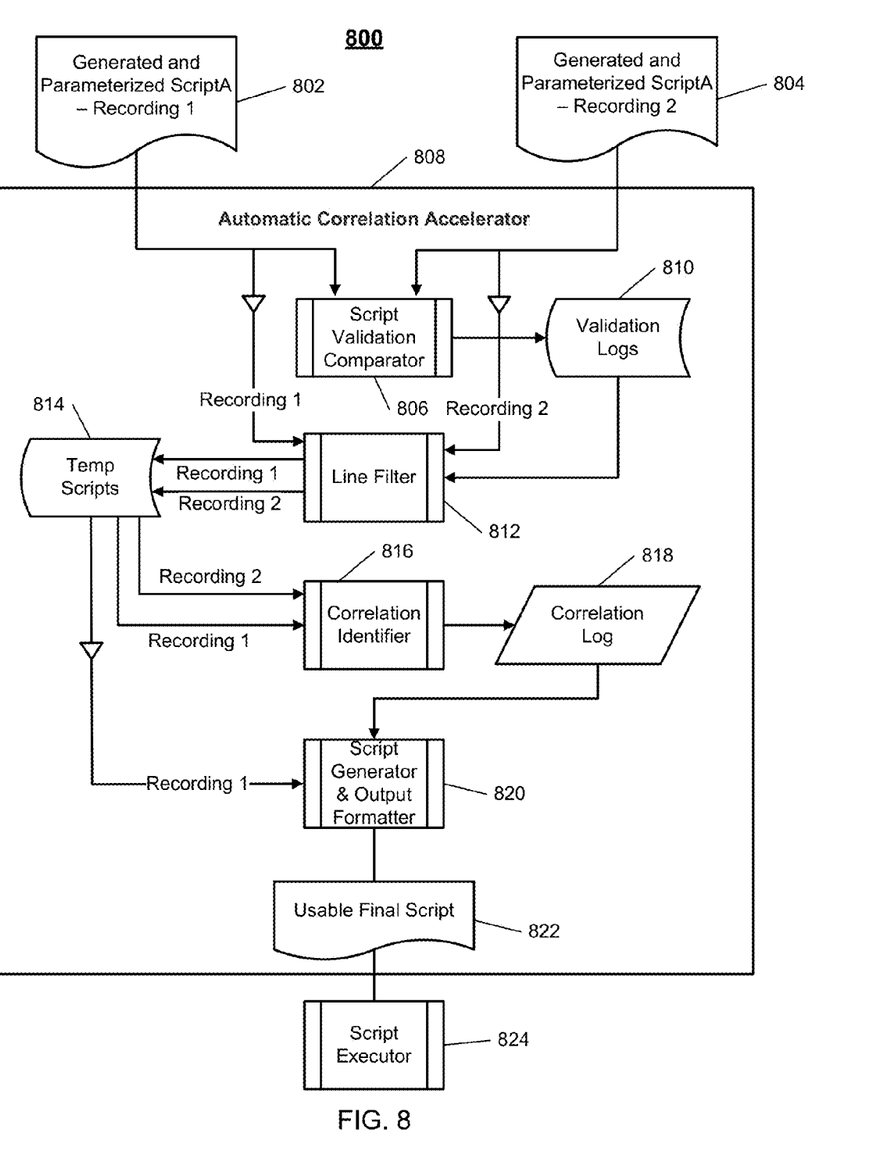

FIG. 8 illustrates a flowchart of an exemplary process 800 for generating a correlated script. In some implementations, operations of the process 800 may be performed by one or more processors included in one or more electronic devices. A first script recording 802 and a second script recording 804 are accessed, such as from electronic storage, and are used by a script validation comparator sub process 806 included in an automatic correlation accelerator system 808.

For example, the script validation comparator sub process 806 may include the execution of the first and second script recordings 802 and 804 and the comparing of server responses received from execution of the first script recording 802 to server responses received from execution of the second script recording 804. Validation and/or comparison results may be generated and may be stored in one or more validation logs 810.

A line filter sub process 812 may use the validation logs 810 and the first script recording 802 and the second script recording 804 to generate temporary scripts 814 (e.g., the temporary scripts 814 may include a temporary version of the first script recording 802 and a temporary version of the second script recording 804). The line filter sub process 812 may, for example, filter lines from the first script recording 802 and/or from the second script recording 804 to facilitate correlation and/or parameterization. For example, the first script recording 802 and/or the second script recording 804 may include extraneous lines which are not related to correlation or parameterization and which if not filtered would cause noise or otherwise distract from or complicate correlation or parameterization processing. The temporary scripts 814 may include, for example, versions of the first script recording 802 and the second script recording 814 with lines filtered (e.g., lines removed).

A correlation identifier sub process 816 uses the temporary scripts 814 and 816 to generate a correlation log 818. For example, the correlation log 818 may be the correlation log 600 described above with respect to FIG. 6.

A script generator sub process 820 may use the correlation log 818 and a temporary version of the first script recording 802 to generate a usable, final script 822. In some implementations, the usable, final script 822 includes parameters identified during a parameterization process. The usable, final script 822 may be executed in a script executor sub process 824. For example, the script executor sub process 824 may include manual or automatic execution of the final, usable script 822 in a performance testing controller to test performance of a system.

Figure 9:
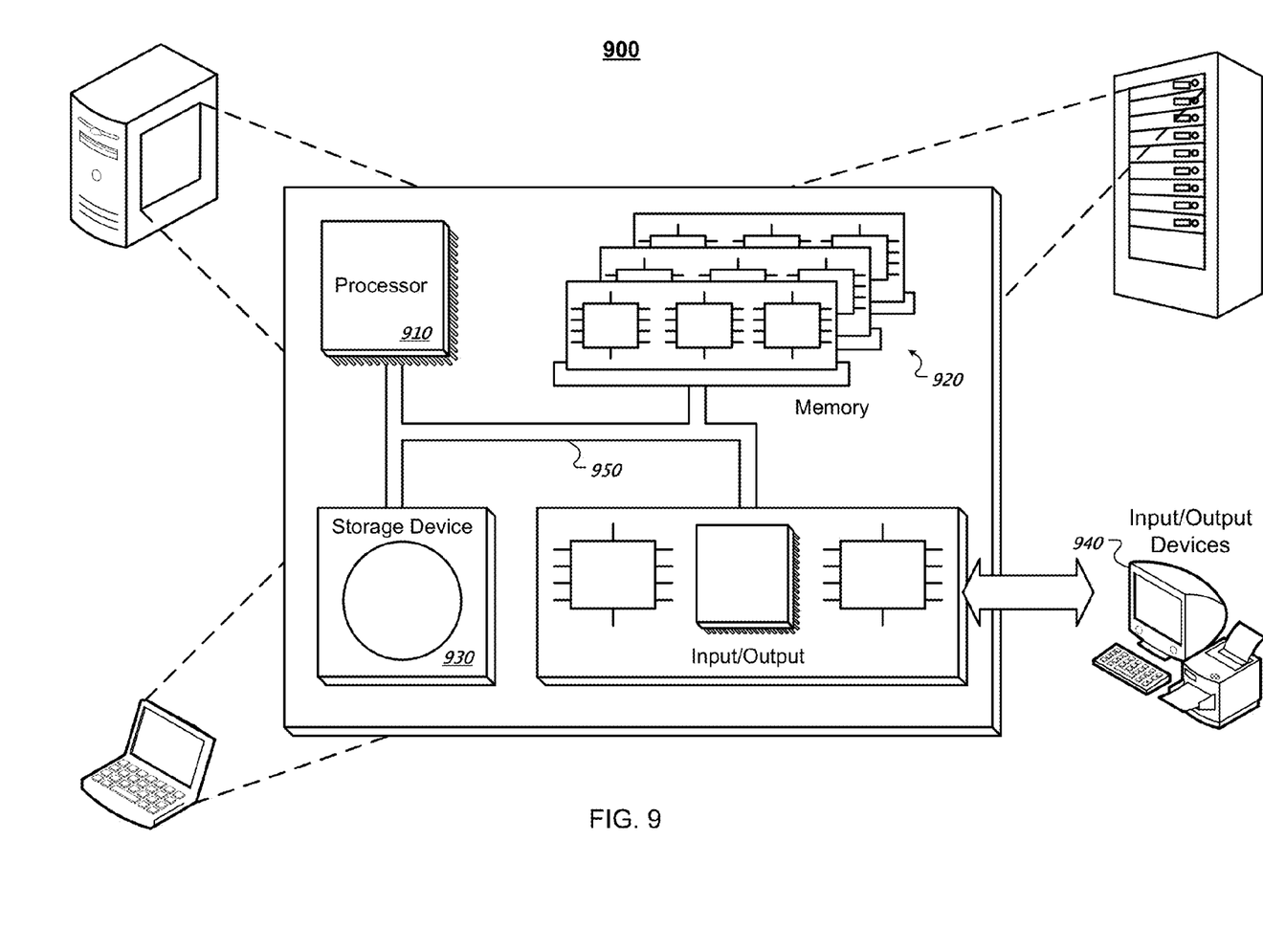

FIG. 9 is a schematic diagram of an example of a generic computer system 900. The system 900 can be used for the operations described in association with the processes 300, 500, and 800, according to one implementation. For example, the system 900 may be included in the automatic correlation system 200.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:

accessing, by a device from an electronic storage, a first response file generated during a first execution of a first recording of a base script on a system that includes at least one processor and at least one memory and a second response file generated during a second execution of a second recording of the base script on the system, the base script defining operations to be executed in testing performance of the system;

determining, by the device, first dynamic value data that describes one or more first dynamic values stored in the first response file and second dynamic value data that describes one or more second dynamic values stored in the second response file;

analyzing, by the device, the first dynamic value data and the second dynamic value data to identify candidate parameters for correlation within the base script;

generating, by the device, a correlated script using the identified candidate parameters and the base script; and storing, by the device, the correlated script.

2. The method of claim 1, further comprising:

causing the system to execute the first recording of the base script to generate the first response file;

causing the system to execute the second recording of the base script again to generate the second response file; and storing a dynamic value list that comprises the first dynamic value data and the second dynamic value data.

3. The method of claim 2, wherein the first recording is identical to the second recording and the first recording and the second recording are for testing a business flow on the system.

4. The method of claim 2, further comprising:

generating the first recording using a script generator and the base script; and generating the second recording using the script generated and the base script.

5. The method of claim 1, further comprising:

causing the system to perform the first execution of the base script to generate the first response file; and causing the system to perform the second execution of the base script to generate the second response file.

6. The method of claim 5, further comprising:

receiving the first dynamic value data from the system during the first execution of the base script; and receiving the second dynamic value data from the system during the second execution of the base script.

7. The method of claim 1, further comprising:
    determining first parameters received during the first execution of the base script based on the first response file and second parameters received during the second execution of the base script based on the second response file;
    analyzing the first parameters and the second parameters to identify other candidate parameters for parameterization within the base script; and
    generating a parameterized script using the identified other candidate parameters and the base script.

8. The method of claim 7, wherein generating the parameterized script using the identified other candidate parameters and the base script comprises:
    generating a parameterization of the correlated script using the identified other candidate parameters and the correlated script.

9. The method of claim 1, wherein the base script comprises instructions that cause the system to simulate a virtual user interacting with the system.

10. The method of claim 1, wherein determining the first dynamic value data that describes the first dynamic values stored in the first response file and the second dynamic value data that describes the second dynamic values stored in the second response file comprises:
    determining a dynamic value list that includes the first dynamic values and the second dynamic values.

11. The method of claim 1, wherein generating the correlated script using the identified candidate parameters and the base script comprises:
    generating the correlated script by inserting, for each of the identified candidate parameters, respective instructions indicating that a received dynamic value is to be saved, into a copy of the base script and at a location that corresponds to the respective identified candidate parameter.

12. The method of claim 1, further comprising:
    causing the system to execute the correlated script.

13. The method of claim 12, further comprising:
    generating performance test output for the system based on the system execution of the correlated script.

14. The method of claim 1, wherein analyzing the first dynamic value data and the second dynamic value data to identify candidate parameters for correlation within the base script comprises:
    generating a correlation log using the first dynamic value data and the second dynamic value data.

15. The method of claim 14, wherein generating the correlation log using the first dynamic value data and the second dynamic value data comprises:
    generating the correlation log that includes, for each identified candidate parameter, a respective dynamic value from the first dynamic values or the second dynamic values and a type of the respective dynamic value.

16. The method of claim 1 further comprising:
    generating a first temporary file by filtering one or more first lines from the first response file; and
    generating a second temporary file by filtering one or more second lines from the second response file.

17. The method of claim 16, wherein determining the first dynamic value data that describes the first dynamic values stored in the first response file and the second dynamic value data that describes the second dynamic values stored in the second response file comprises:
    analyzing the first temporary file and the second temporary file to determine the first dynamic data and the second dynamic value data.

18. The method of claim 17, wherein generating the correlated script using the identified candidate parameters and the base script comprises:
    generating the correlated script using the first temporary file and the second temporary file.

19. A device, comprising:
    one or more first processors to:
        access a first response file generated during a first execution of a first recording of a base script on a system that includes at least one second processor and at least one memory and a second response file generated during a second execution of a second recording of the base script on the system, the base script defining operations to be executed in testing performance of the system;
        determine first dynamic value data that describes one or more first dynamic values stored in the first response file and second dynamic value data that describes one or more second dynamic values stored in the second response file;
        analyze the first dynamic value data and the second dynamic value data to identify candidate parameters for correlation within the base script;
        generate a correlated script using the identified candidate parameters and the base script; and
        store the correlated script.

20. A non-transitory computer-readable medium storing instructions, the instructions comprising:
    one or more instructions that, when executed by one or more first processors of a device, cause the one or more first processors to:
        access a first response file generated during a first execution of a first recording of a base script on a system that includes at least one second processor and at least one memory and a second response file generated during a second execution of a second recording of the base script on the system, the base script defining operations to be executed in testing performance of the system;
        determine first dynamic value data that describes one or more first dynamic values stored in the first response file and second dynamic value data that describes one or more second dynamic values stored in the second response file;
        analyze the first dynamic value data and the second dynamic value data to identify candidate parameters for correlation within the base script;
        generate a correlated script using the identified candidate parameters and the base script; and
        store the correlated script.

21. The computer-readable medium of claim 20, further comprising:
    causing the system to execute the first recording of the base script to generate the first response file;
    causing the system to execute the second recording of the base script again to generate the second response file; and
    storing a dynamic value list that comprises the first dynamic value data and the second dynamic value data.

22. The computer-readable medium of claim 21, wherein the first recording is identical to the second recording and the first recording and the second recording are for testing a business flow on the system.

23. The computer-readable medium of claim 21, further comprising:
    generating the first recording using a script generator and the base script; and generating the second recording using the script generated and the base script.

24. The computer-readable medium of claim 20, further comprising:
   causing the system to perform the first execution of the base script to generate the first response file; and
   causing the system to perform the second execution of the base script to generate the second response file.

25. The computer-readable medium of claim 24, further comprising:
   receiving the first dynamic value data from the system during the first execution of the base script; and
   receiving the second dynamic value data from the system during the second execution of the base script.

26. The computer-readable medium of claim 20, further comprising:
   determining first parameters received during the first execution of the base script based on the first response file and second parameters received during the second execution of the base script based on the second response file;
   analyzing the first parameters and the second parameters to identify other candidate parameters for parameterization within the base script; and
   generating a parameterized script using the identified other candidate parameters and the base script.

27. The computer-readable medium of claim 26, wherein generating the parameterized script using the identified other candidate parameters and the base script comprises:
   generating a parameterization of the correlated script using the identified other candidate parameters and the correlated script.

28. The computer-readable medium of claim 20, wherein the base script comprises instructions that cause the system to simulate a virtual user interacting with the system.

29. The computer-readable medium of claim 20, wherein determining the first dynamic value data that describes the first dynamic values stored in the first response file and the second dynamic value data that describes the second dynamic values stored in the second response file comprises:
   determining a dynamic value list that includes the first dynamic values and the second dynamic values.

30. The computer-readable medium of claim 20, wherein generating the correlated script using the identified candidate parameters and the base script comprises:
   generating the correlated script by inserting, for each of the identified candidate parameters, respective instructions indicating that a received dynamic value is to be saved, into a copy of the base script and at a location that corresponds to the respective identified candidate parameter.

31. The computer-readable medium of claim 20, further comprising: causing the system to execute the correlated script.

32. The computer-readable medium of claim 31, further comprising:
   generating performance test output for the system based on the system execution of the correlated script.

33. The computer-readable medium of claim 20, wherein analyzing the first dynamic value data and the second dynamic value data to identify candidate parameters for correlation within the base script comprises:
   generating a correlation log using the first dynamic value data and the second dynamic value data.

34. The computer-readable medium of claim 33, wherein generating the correlation log using the first dynamic value data and the second dynamic value data comprises:
   generating the correlation log that includes, for each identified candidate parameter, a respective dynamic value from the first dynamic values or the second dynamic values and a type of the respective dynamic value.

35. The computer-readable medium of claim 20, further comprising:
   generating a first temporary file by filtering one or more first lines from the first response file; and
   generating a second temporary file by filtering one or more second lines from the second response file.

36. The computer-readable medium of claim 35, wherein determining the first dynamic value data that describes the first dynamic values stored in the first response file and the second dynamic value data that describes the second dynamic values stored in the second response file comprises:
   analyzing the first temporary file and the second temporary file to determine the first dynamic data and the second dynamic value data.

37. The computer-readable medium of claim 36, wherein generating the correlated script using the identified candidate parameters and the base script comprises:
   generating the correlated script using the first temporary file and the second temporary file.

* * * * *

UNITED STATES PATENT AND TRADEMARK OFFICE
CERTIFICATE OF CORRECTION

| | | |
|---|---|---|
| PATENT NO. | : 9,336,116 B2 | Page 1 of 1 |
| APPLICATION NO. | : 14/339814 | |
| DATED | : May 10, 2016 | |
| INVENTOR(S) | : Gouthaman et al. | |

It is certified that error appears in the above-identified patent and that said Letters Patent is hereby corrected as shown below:

Title page, column 1, item 73 (Assignee), line 2, delete "(IL)" and insert -- (IE) --, therefor.

Title page, column 2, item 74 (Attorney, Agent, or Firm), line 1, delete "Ricahrdson" and insert -- Richardson --, therefor.

Signed and Sealed this
Ninth Day of August, 2016

Michelle K. Lee
*Director of the United States Patent and Trademark Office*